United States Patent
Oowatari et al.

(10) Patent No.: US 9,013,078 B2
(45) Date of Patent: Apr. 21, 2015

(54) AUTOMOTIVE ALTERNATOR INCLUDING RECTIFIER TERMINAL HAVING TWO PORTIONS MADE OF DIFFERENT METALS

(75) Inventors: Shinya Oowatari, Anjo (JP); Shinichi Matsubara, Anjo (JP); Yoshinori Hayashi, Toyohashi (JP); Masatoshi Koumura, Okazaki (JP)

(73) Assignee: Denso Corporation, Kariya (JP)

( * ) Notice: Subject to any disclaimer, the term of this patent is extended or adjusted under 35 U.S.C. 154(b) by 514 days.

(21) Appl. No.: 12/230,742

(22) Filed: Sep. 4, 2008

(65) Prior Publication Data

US 2009/0058211 A1    Mar. 5, 2009

(30) Foreign Application Priority Data

Sep. 5, 2007    (JP) .................................. 2007-229607

(51) Int. Cl.
*H02K 3/02* (2006.01)
*H02K 11/04* (2006.01)
*H02K 3/50* (2006.01)
*H02K 15/00* (2006.01)

(52) U.S. Cl.
CPC ............... *H02K 11/046* (2013.01); *H02K 3/02* (2013.01); *H02K 3/50* (2013.01); *H02K 15/0056* (2013.01)

(58) Field of Classification Search
CPC .......... H02K 3/02; H02K 11/04; H02K 3/50; H02K 3/505; H02K 11/02
USPC .......................................... 310/68 D, 71, 179
See application file for complete search history.

(56) References Cited

U.S. PATENT DOCUMENTS

| | | | |
|---|---|---|---|
| 4,315,175 A * | 2/1982 | Hamilton et al. | 310/71 |
| 6,124,660 A * | 9/2000 | Umeda et al. | 310/215 |
| 6,429,556 B1 * | 8/2002 | Nakamura et al. | 310/71 |
| 6,459,186 B1 | 10/2002 | Umeda et al. | |
| 7,327,063 B2 * | 2/2008 | Matsubara | 310/184 |
| 2007/0007843 A1 * | 1/2007 | Matsubara | 310/179 |
| 2009/0058211 A1 * | 3/2009 | Oowatari et al. | 310/179 |

FOREIGN PATENT DOCUMENTS

| | | |
|---|---|---|
| JP | A-51-27405 | 3/1976 |
| JP | A-5-236691 | 9/1993 |
| JP | A-11-191946 | 7/1999 |
| JP | A-2001-086706 | 3/2001 |
| JP | A-2007-020302 | 1/2007 |
| JP | A-2007-181396 | 7/2007 |

OTHER PUBLICATIONS

Japanese Notification of Reasons for Rejection; date of dispatch: Jun. 30, 2009.

* cited by examiner

*Primary Examiner* — Michael Andrews
(74) *Attorney, Agent, or Firm* — Oliff PLC

(57) ABSTRACT

An automotive alternator includes a stator winding that is made of a metal other than copper and copper alloys. The alternator also includes a built-in rectifier that includes a plurality of rectifying elements and a plurality of electrical conductors. The rectifying elements and the electrical conductors together form a rectification circuit for rectifying AC power output from the stator winding into DC power. Further, at least one of the electrical conductors includes first and second portions. The first portion is connected to at least one of the rectifying elements, and made of copper or a copper alloy. The second portion is connected to the stator winding, and made of a metal containing a metallic element that is also contained in the metal of which the stator winding is made.

6 Claims, 4 Drawing Sheets

US 9,013,078 B2

AUTOMOTIVE ALTERNATOR INCLUDING RECTIFIER TERMINAL HAVING TWO PORTIONS MADE OF DIFFERENT METALS

CROSS-REFERENCE TO RELATED APPLICATION

This application is based on and claims priority from Japanese Patent Application No. 2007-229607, filed on Sep. 5, 2007, the content of which is hereby incorporated by reference in its entirety into this application.

BACKGROUND OF THE INVENTION

1. Technical Field of the Invention

The present invention relates to automotive alternators for use in, for example, passenger cars and trucks.

2. Description of the Related Art

Japanese Patent First Publication No. 2001-86706 discloses an automotive alternator which includes a built-in rectifier. The rectifier has diodes serving as rectifying elements and terminals for making electric connection between the diodes. The terminals are also connected to a stator winding of the alternator. Further, to effectively dissipate heat generated by the diodes, the terminals are made of a metal having high heat conductivity, such as copper or a copper alloy.

However, when the stator winding is made of a metal other than copper and copper alloys, it is impossible to easily join, for example by welding, lead portions of the stator winding to the terminals of the rectifier during assembly of the alternator.

Japanese Patent First Publication No. 2007-20302, an English equivalent of which is US 2007/0007843 A1, discloses an automotive alternator where the majority of a stator winding is made of aluminum with the remainder, including lead wires, made of copper. With such a configuration, the lead wires of the stator winding can be easily joined to the copper-made terminals of a rectifier of the alternator, without increasing the manufacturing cost of the alternator.

However, in the stator winding, the joining between the majority made of alumina and the remainder made of copper is a bimetallic joining; therefore, electrolytic corrosion may easily occur around the joining portions due to the difference in self potential between the majority and reminder of the stator winding, thereby lowering the strength of the stator winding.

SUMMARY OF THE INVENTION

According to the present invention, there is provided an automotive alternator which includes a rotor, a stator, and a rectifier.

The rotor creates a rotating magnetic field. The stator generates AC power in the rotating magnetic field created by the rotor. The stator includes a stator winding from which the AC power is output. The stator winding is made of a metal other than copper and copper alloys. The rectifier includes a plurality of rectifying elements and a plurality of electrical conductors. The rectifying elements and the electrical conductors together form a rectification circuit for rectifying the AC power output from the stator winding into DC power.

Further, at least one of the electrical conductors includes first and second portions. The first portion is connected to at least one of the rectifying elements, and made of copper or a copper alloy. The second portion is connected to the stator winding, and made of a metal containing a metallic element that is also contained in the metal of which the stator winding is made.

With the above configuration, the second portion of the at least one of the electrical conductors can be easily joined by, for example, welding to the stator winding since the second portion is made of the metal that contains the same metallic element as the metal of which the stator winding is made.

Moreover, since the stator winding is made of the single metal, it is possible to prevent a decrease in strength of the stator winding which may occur when the stator winding is formed by joining two portions made of different metals.

Furthermore, since the first portion of the at least one of the electrical conductors is made of copper or a copper alloy, it is possible to effectively dissipate heat generated by the rectifying elements of the rectifier.

According to a further implementation of the invention, the rectifier further includes a resin-made insulator. The at least one of the electrical conductors further includes a joining portion between the first and second portions. The joining portion is embedded in the insulator.

With the above configuration, it is possible to effectively suppress the progress of electrolytic corrosion around the joining portion.

Preferably, in the automotive alternator, the second portion has a different cross-sectional area perpendicular to a current conduction direction of the at least one of the electrical conductors from the first portion.

With the above configuration, when the metals of which the first and second portions are respectively made have different strengths, it is possible to make the one of the two portions which is made of the metal with the lower strength have the larger cross-sectional area, thereby securing the overall strength of the terminal.

It is also preferable that in the automotive alternator, both the stator winding and the second portion of the at least one of the electrical conductors are made of aluminum.

With the above configuration, it is possible to significantly reduce both the weight and manufacturing cost of the automotive alternator while securing the joining strength between the stator winding and the second portion.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

One preferred embodiment of the present invention will be described hereinafter with reference to FIGS. 1-5B.

Figure 1:
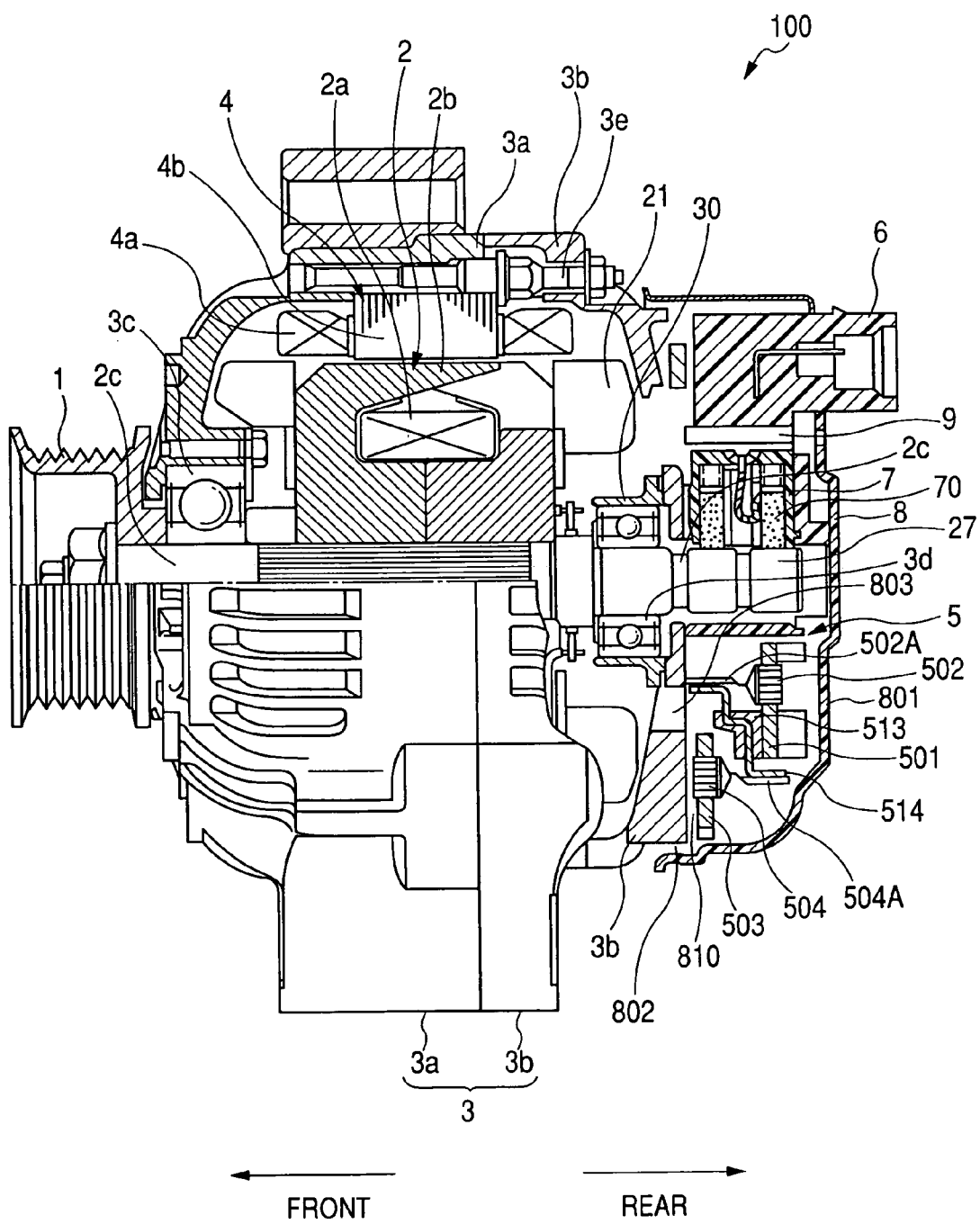
FIG. 1 is a partially cross-sectional view showing the overall configuration of an automotive alternator according to a preferred embodiment of the invention.

FIG. 1 shows the overall configuration of an automotive alternator 100 according to an embodiment of the invention.

As shown in FIG. 1, the automotive alternator 100 includes a rotor 2, a stator 4, a frame 3, a rectifier 5, a brush holder 7, brushes 70, a voltage regulator 9, a connector case 6, a protective cover 8, a pulley 1, and a cooling fan 21.

The rotor 2 includes a field winding 2a, a pair of lundell-type pole cores 2b, and a rotary shaft 2c. The field winding 2a is wound around the pole cores 2b that is fitted on the rotary shaft 2c. When filed current (or exciting current) is supplied to the field winding 2a during rotation of the rotor 2, the pole cores 2b form magnetic poles, thereby creating a rotating magnetic field.

The stator 4 is so arranged as to surround the rotor 2. The stator 4 includes a three-phase stator winding 4a and a stator core 4b. The stator winding 4a is so wound around the stator core 4b that the rotating magnetic field created by the rotor 2 passes through the stator core 4b, inducing three-phase alternating current in the stator winding 4a.

In the present embodiment, the stator winding 4a is made of a metal other than copper and copper alloys, for example aluminum.

The frame 3 is composed of a front frame 3a and a rear frame 3b. The frame 3 supports the rotor 2 via bearings 3c and 3d, which are respectively provided in the front and rear frames 3a and 3d. The frame 3 also supports the stator core 4b by means of a plurality of fixing bolts 3e.

The rectifier 5 is configured to full-wave rectify the three-phase AC power output from the stator winding 4a to obtain DC power. The details of the rectifier 5 will be described later.

The brush holder 7 holds therein the brushes 70. The brushes 70 are in sliding contacts with slip rings 27 provided on the rotary shaft 2c, so that the field current can be supplied from the brushes 70 to the field winding 2a via the slip rings 27.

The voltage regulator 9 is configured to regulate the DC voltage output from the rectifier 5 by controlling the field current supplied to the field winding 2a.

The connector case 6 holds therein terminals for inputting and outputting electric signals from and to a vehicle control device (not shown).

The protective cover 8 is made of a resin material. The protective cover 8 is so fixed to the rear frame 3b that it covers the rectifier 5, the brush holder 7, and the voltage regulator 9, thereby protecting them from foreign matter, such as water and stones.

The pulley 1 is mounted on the rotary shaft 2c to transmit a driving force from an engine of a motor vehicle to the alternator 100 via a belt (not shown).

The cooling fan 21 is mounted to a rear end surface of the pole cores 2b of the rotor 2. The cooling fan 21 rotates, with rotation of the rotor 2, to create a cooling air flow that passes through the rectifier 5.

After having described the overall configuration of the automotive alternator 100, the details of the rectifier 5 according to the present embodiment will be described hereinafter.

Figure 2:
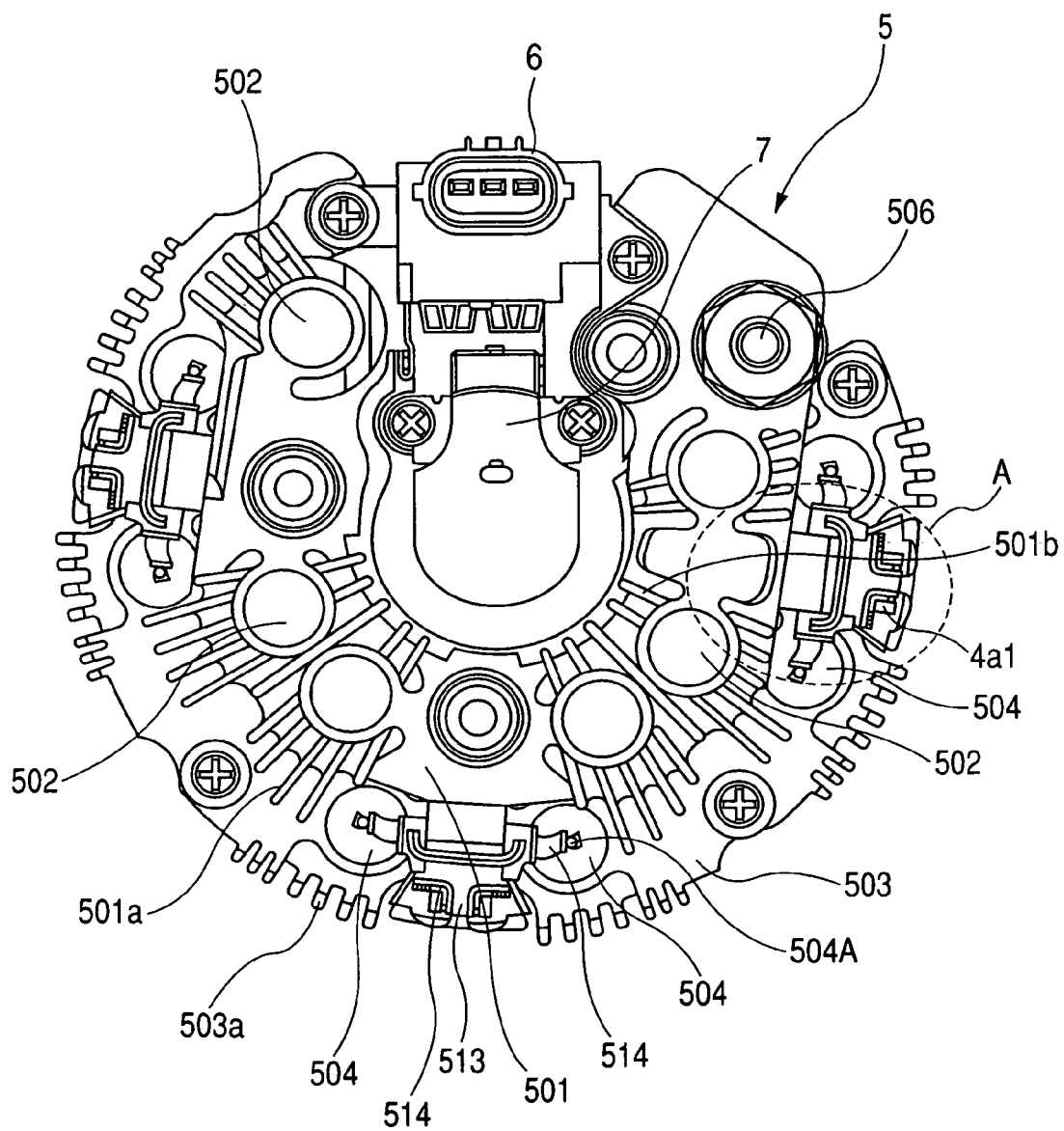
FIG. 2 is a plan view showing the configuration of a rectifier of the alternator.

Referring to FIGS. 1-2, the rectifier 5 includes a positive-side heat sink 501, a plurality of positive-side diodes 502 mounted to the positive-side heat sink 501, a negative-side heat sink 503, a plurality of negative-side diodes 504 mounted to the negative-side heat sink 503, and a terminal block 513 interposed between the positive-side and negative-side heat sinks 501 and 503.

The positive-side and negative-side heat sinks 501 and 503 are apart from each other in the axial direction of the rotor 2 (i.e., the axial direction of the rotary shaft 2c). Further, the positive-side and negative-side heat sinks 501 and 503 are so disposed around the rotary shaft 2c that they partially overlap each other in the axial direction of the rotor 2.

The terminal block 513 is made of a resin material, such as a PPS resin. The terminal block 513 supports both the positive-side and negative-side heat sinks 501 and 503, and electrically insulates them from each other. The terminal block 513 has terminals 514 insert-molded therein. The terminals 514 are electrical conductors that electrically connect the three-phase stator winding 4a of the stator 4 to the positive-side diodes 502 and the negative-side diodes 504.

The positive-side diodes 502 and the negative-side diodes 504 function as rectifying elements to full-wave rectify the three-phase AC power output from the stator winding 4a.

Each of the positive-side diodes 502 is press-fit in one of a plurality of fitting holes formed in the positive-side heat sink 501. Further, as seen from FIG. 1, each of the positive-side diodes 502 has a lead portion 502A extending therefrom toward the negative-side heat sink 503.

On the contrary, each of the negative-side diodes 504 is press-fit in one of a plurality of fitting holes formed in the negative-side heat sink 503. Further, as seen from FIG. 1, each of the negative-side diodes 504 has a lead portion 504A extending therefrom toward the positive-side heat sink 501.

The lead portions 502A extending from the positive-side diodes 502 and the lead portions 504A extending from the negative-side diodes 504 are connected to the terminals 514 in the terminal block 513, thereby forming at least one set of three-phase full-wave rectification circuit.

In the present embodiment, a total of six positive-side diodes 502 and a total of six negative-side diodes 504 are electrically connected, by the terminals 514, to form two sets of three-phase full-wave rectification circuit. The DC power obtained by the full-wave rectification is taken out from a blot 506 that is provided on the positive-side heat sink 501 to serve as an output terminal of the rectifier 5.

The rectifier 5 is interposed between the rear frame 3b and the protective cover 8 and fixed therebetween by means of a plurality of fixing bolts (not shown). The fixing bolts also serve as supporting members to support a rear bearing box 30.

In the present embodiment, the negative-side heat sink 503 has a greater outer diameter than the positive-side heat sink 501; thus, the negative-side diodes 504 are located radially outside of the positive-side diodes 502. In addition, both the positive-side and negative-side heat sinks 501 and 503 may be made, for example, of aluminum or copper.

The protective cover 8 has a plurality of air intake holes 801 formed therethrough in the vicinity of the positive-side diodes 502. Further, a plurality of ribs 501a are formed on a radially outer periphery of the positive-side heat sink 501; a plurality of ribs 501b are formed on a radially inner periphery of the positive-side heat sink 501. All the ribs 501a and 501b extend in the axial direction of the rotor 2 toward the protective cover 8.

With the above formation, the cooling air flow created by the cooling fan 21 will enter the inside of the protective cover 8 through the air intake holes 801 and pass through the positive-side diodes 502. Moreover, with the ribs 501a and 501b, the total heat dissipation area of the positive-side heat sink 501 is increased, thereby further effectively cooling the positive-side diodes 502.

On the other hand, a plurality of fins 503a are formed on a radially outer periphery of the negative-side heat sink 503 to extend in the radial direction of the rotor 2. With the fins 503a, the total heat dissipation area of the negative-side heat sink 503 is increased.

Further, an air gap 802 is formed between a radially outer portion of the protective cover 8 and a radially outer surface of the rear frame 3b; an air gap 810 is formed between a rear end surface of the rear frame 3b and a front end surface of the negative-side heat sink 503. The air gaps 802 and 810 communicate with each other. Furthermore, there is formed a plurality of through-holes 803 in the rear frame 3b.

In operation, with rotation of the cooling fan 21, the cooling air is introduced into the alternator 100 through both the air intake holes 801 and the air gap 802, and passes through both the air gap 810 and the through-holes 803 of the rear frame 3b. Thus, the negative-side heat sink 503 is cooled by the cooling air when it passes through the air gap 810.

Figure 3:
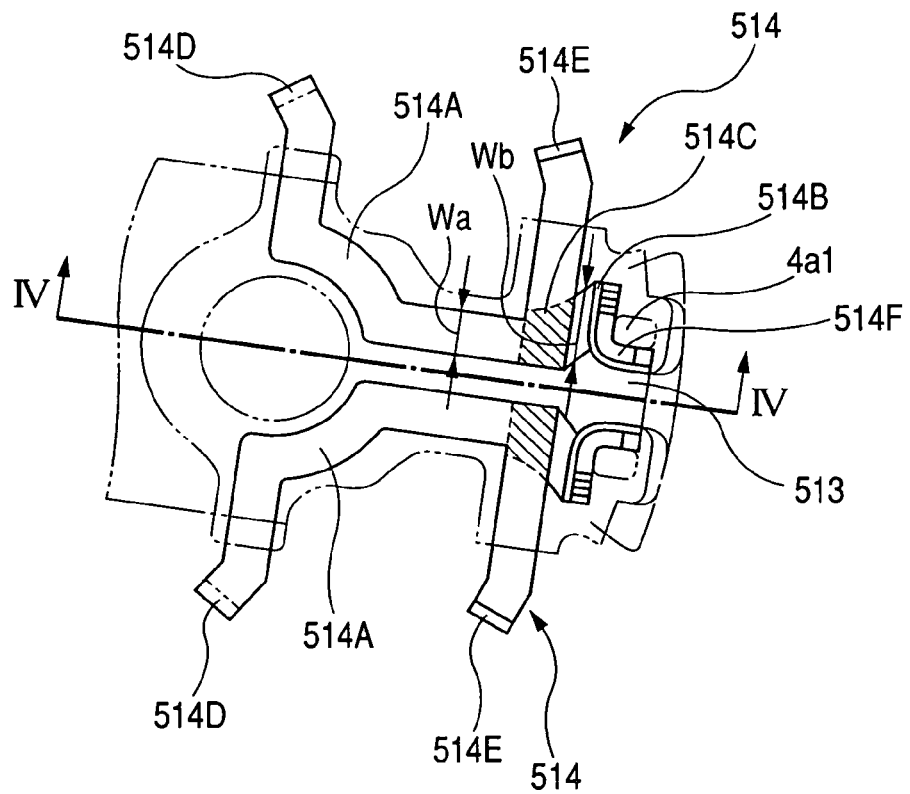
FIG. 3 is an enlarged view showing the region A enclosed with a dashed line in FIG. 2.
Figure 4:
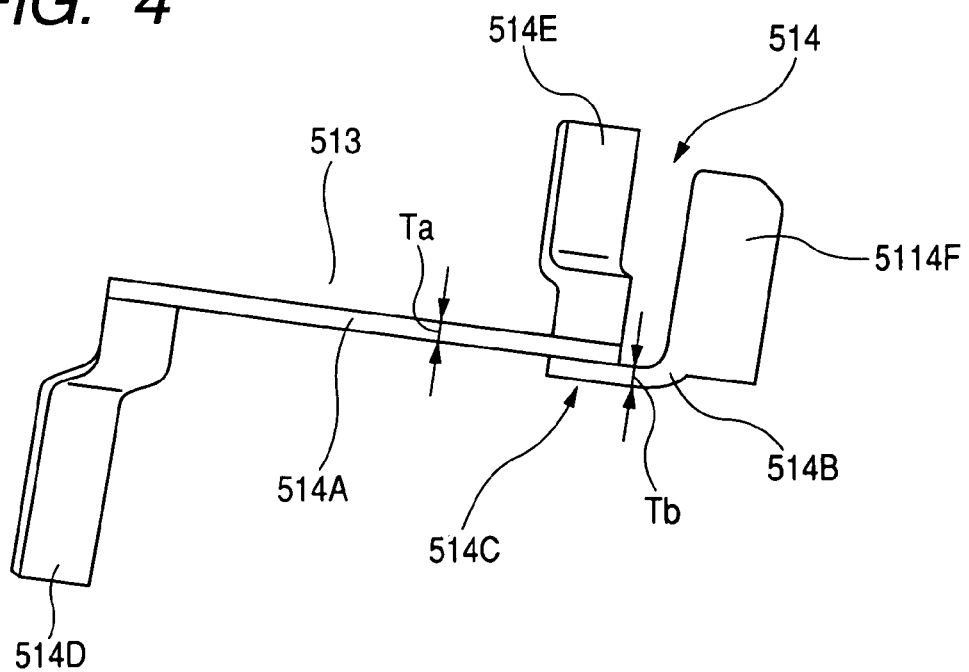
FIG. 4 is a perspective view in the direction IV of FIG. 3 showing a terminal of the rectifier without a terminal block covering it.
Figure 5A:
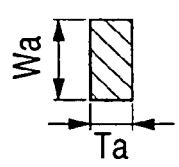
FIGS. 5A and 5B are schematic cross-sectional views respectively illustrating cross-sectional areas of first and second portions of the terminal perpendicular to a current conduction direction of the terminal.
Figure 5B:
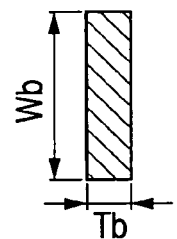

Referring now to FIGS. 3 and 4, each of the terminals 514 of the rectifier 5 has the majority thereof embedded in the terminal block 513, with the remainder exposed to the outside of the terminal block 513.

In the present embodiment, each of the terminals 514 includes a first portion 514A and a second portion 514B, which are made of different metals. More specifically, the first portion 514A is made of copper or a copper alloy. On the other hand, the second portion 514B is made of a metal that contains the same metallic element as the metal of which the stator winding 4a is made. For example, while the stator winding 4a is made of aluminum, the second portion 514B is made of aluminum or an aluminum alloy.

A small part of the first portion 514A overlaps with a small part of the second portion 514B; the overlapping parts are joined together by, for example, ultrasonic bonding, soldering, brazing, crimping, pressure welding, explosive cladding, or explosive welding to form a joining portion 514C. The joining portion 514C is embedded in the resin-made terminal block 513; in other words, it is not exposed to the outside of the terminal block 513.

The first portion 514A includes a first end 514D, which is connected to the lead portion 502A of a corresponding one of the positive-side diodes 502, and a second end 514E that is connected to the lead portion 504A of a corresponding one of the negative-side diodes 504.

The second portion 514B includes an end portion 514F that is joined by, for example, TIG welding to a corresponding lead wire 4a1 of the stator winding 4a.

Further, as shown in FIGS. 3-5B, the first portion 514A has a smaller cross-sectional area perpendicular to the current conduction direction (i.e, the current-flowing direction) of the terminal 514 than the second portion 514B. More specifically, the cross-sectional area of the first portion 514A perpendicular to the current conduction direction is equal to Ta×Wa, where Ta and Wa are respectively the thickness and width of the first portion 514A. The cross-sectional area of the second portion 514B perpendicular to the current conduction direction is equal to Tb×Wb, where Tb and Wb are respectively the thickness and width of the second portion 514B. The width Wa of the first portion 514A is smaller than the width Wb of the second portion 514B, while the thickness Ta of the first portion 514A is substantially equal to the thickness Tb of the second portion 514B.

The above-described automotive alternator 100 according to the present embodiment has the following advantages.

In the present embodiment, the stator winding 4a of the stator 4 is made of a metal other than copper and copper alloys. The second portion 514B of each of the terminals 514 of the rectifier 5 is made of a metal that contains the same metallic element as the metal of which the stator winding 4a is made. Consequently, the second portion 514B can be easily joined by, for example, welding to the corresponding lead wire 4a1 of the stator winding 4a.

Further, since the stator winding 4a is made of the single metal, it is possible to prevent a decrease in strength of the stator winding 4a which may occur when the stator winding 4a is formed by joining two portions made of different materials.

In particular, when both the stator winding 4a and the second portion 514B of each of the terminals 514 are made of aluminum, it is possible to significantly reduce both the weight and manufacturing cost of the alternator 100 while securing the joining strength between the stator winding 4a and the second portion 514B.

Moreover, since the first portion 514A of each of the terminals 514 is made of copper or a copper alloy, it is possible to effectively dissipate heat generated by the positive-side and negative-side diodes 502 and 504.

In the present embodiment, the joining portion 514C joining the first and second portions 514A and 514B of each of the terminals 514 is embedded in the resin-made terminal block 513. Consequently, it is possible to effectively suppress the progress of electrolytic corrosion around the joining portion 514C. Further, since no additional insulative member is required to cover the joining portion 514C, it is possible to simplify the manufacturing process, thereby reducing the manufacturing cost of the alternator 100.

In the present embodiment, for each of the terminals 514, the second portion 514B has a different cross-sectional area perpendicular to the current conduction direction of the terminal 514 from the first portion 514A. Consequently, when the first and second portions 514A and 514B are made of metals with different strengths, it is possible to make the one of the two portions 514A and 514B which is made of the metal with the lower strength have the larger cross-sectional area, thereby securing the overall strength of the terminal 514. For example, when the first and second portions 514A and 514B are respectively made of copper and aluminum, it is possible to make the second portion 514B have the larger cross-sectional area.

While the above particular embodiment of the present invention has been shown and described, it will be understood by those skilled in the art that various modifications, changes, and improvements may be made without departing from the spirit of the invention.

Figure 6A:
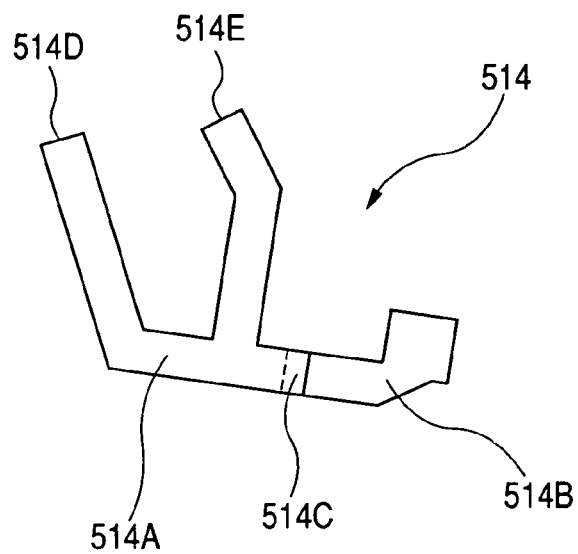
FIGS. 6A and 6B are schematic views illustrating a possible modification of the terminal.

For example, in the previous embodiment, each of the terminals 514 includes one first portion 514A and one second portion 514B that are joined together by one joining portion 514C, as illustrated in FIG. 6A.

Figure 6B:
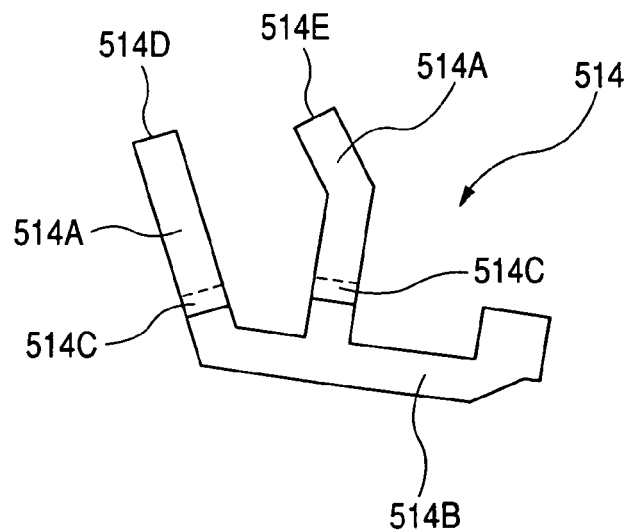

However, each of the terminals 514 may be modified to include two first portions 514A and one second portion 514B that are joined together by two joining portions 514C, as illustrated in FIG. 6B.

What is claimed is:
1. An automotive alternator comprising:
a rotor that creates a rotating magnetic field;
a stator that generates alternating current (AC) power in the rotating magnetic field created by the rotor, the stator including a stator winding from which the AC power is output, the stator winding being made of a metal other than copper and copper alloys; and
a rectifier including a plurality of rectifying elements and a plurality of electrical conductors, the rectifying elements and the electrical conductors together forming a rectification circuit for rectifying the AC power output from the stator winding into DC power,
wherein at least one of the electrical conductors includes first and second portions,
wherein the first portion is connected to at least one of the rectifying elements, and the first portion is made of one of copper and a copper alloy, wherein the second portion is connected to the stator winding, and the second portion is made of a metal containing a metallic element that is also contained in the metal of which the stator winding is made, wherein the rectifier further comprises a resin-made insulator, wherein the at least one of the electrical conductors further comprises a joining portion between a joining surface of the first portion and a joining surface of the second portion, wherein the joining portion comprises the entire area over which the first portion and the second portion are in direct contact, wherein the entire joining surface of the first portion throughout the joining portion is coplanar with a surface of the first portion outside the joining portion, and the entire joining surface of the second portion throughout the joining portion is coplanar with a surface of the second portion outside the joining portion, and wherein the joining portion is embedded in the insulator.

2. The automotive alternator as set forth in claim 1, wherein the second portion has a different cross-sectional area perpendicular to a current conduction direction of the at least one of the electrical conductors from the first portion.

3. The automotive alternator as set forth in claim 1, wherein both the stator winding and the second portion of the at least one of the electrical conductors are made of aluminum.

4. The automotive alternator as set forth in claim 1, wherein a thickness of the first portion is substantially uniform throughout the joining portion and outside the joining portion, and a thickness of the second portion is substantially uniform throughout the joining portion and outside the joining portion.

5. The automotive alternator as set forth in claim 1, wherein the first and second portions are joined by ultrasonic bonding, soldering, or brazing.

6. An automotive alternator comprising:

a rotor that creates a rotating magnetic field;

a stator that generates alternating current (AC) power in the rotating magnetic field created by the rotor, the stator including a stator winding from which the AC power is output, the stator winding being made of a metal other than copper and copper alloys; and a rectifier including a plurality of rectifying elements and a plurality of electrical conductors, the rectifying elements and the electrical conductors together forming a rectification circuit for rectifying the AC power output from the stator winding into DC power, wherein at least one of the electrical conductors includes first and second portions, wherein the first portion is connected to at least one of the rectifying elements, and the first portion is made of one of copper and a copper alloy, wherein the second portion is connected to the stator winding, and the second portion is made of a metal containing a metallic element that is also contained in the metal of which the stator winding is made, wherein the rectifier further comprises (i) a resin-made insulator and (ii) at least one heat sink to which the rectifying elements are mounted, and the at least one heat sink is made of a metal containing a metallic element that is also contained in the second portion, wherein the at least one of the electrical conductors further comprises a joining portion between the first and second portions, wherein the joining portion comprises the entire area over which the first portion and the second portion are in direct contact, and wherein the joining portion is embedded in the insulator.

* * * * *